United States Patent [19]

Rouse et al.

[11] Patent Number: 4,718,172
[45] Date of Patent: Jan. 12, 1988

[54] TURBINE BLADE RADIAL POSITION GAGE

[75] Inventors: Marshall J. Rouse, Charlotte, N.C.; Albert J. Partington, Winter Springs, Fla.

[73] Assignee: Westinghouse Electric Corp., Pittsburgh, Pa.

[21] Appl. No.: 913,881

[22] Filed: Sep. 30, 1986

[51] Int. Cl.$^4$ .................................... G01B 5/00
[52] U.S. Cl. .......................... 33/530; 33/531; 33/551
[58] Field of Search ............... 33/501, 531, 552, 546, 33/181 R, 535, 530, 551

[56] References Cited

U.S. PATENT DOCUMENTS

| | | | |
|---|---|---|---|
| 2,969,597 | 1/1961 | Croshier | 33/535 X |
| 3,273,252 | 9/1966 | Bunge | 33/535 |
| 3,848,338 | 11/1974 | Herman | 33/552 |
| 4,475,291 | 10/1984 | Aymen | 33/552 |
| 4,533,298 | 8/1985 | Partington | 416/191 |
| 4,601,110 | 7/1986 | Donaldson | 33/552 X |

Primary Examiner—Harry N. Haroian

[57] ABSTRACT

A gage for determining alignment of a turbine rotor blade in an assembly position on a turbine rotor. The gage includes a precision base for positioning on the rotor surface adjacent a blade to establish a tangent line perpendicular to a rotor radial line through the center of a slot in which a blade is disposed. A standard extends from the base and carries a first contact for positioning against a low portion of the blade and a second measuring contact for positioning against an upper portion of the blade. The measuring contact provides an indication of blade misalignment.

6 Claims, 8 Drawing Figures

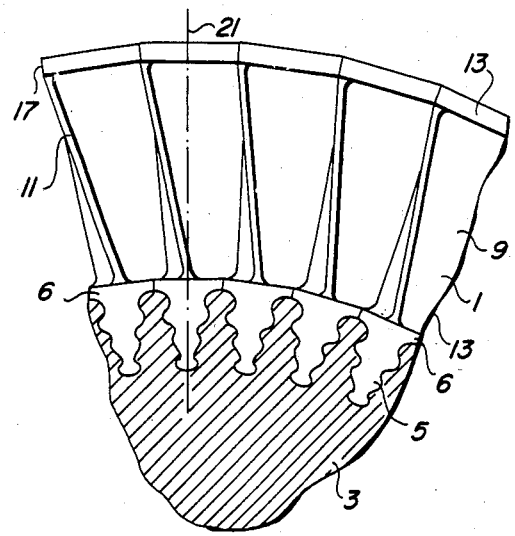
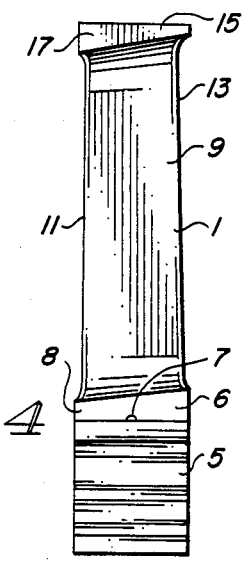
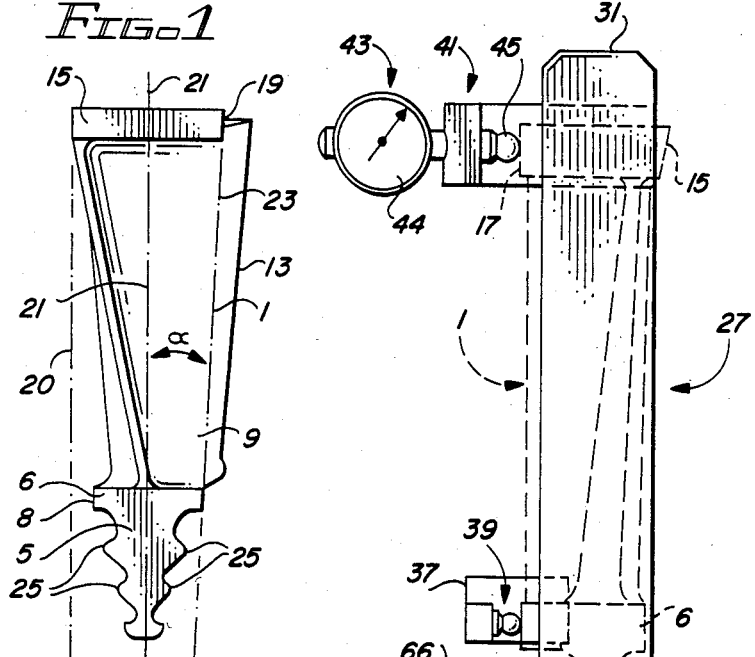
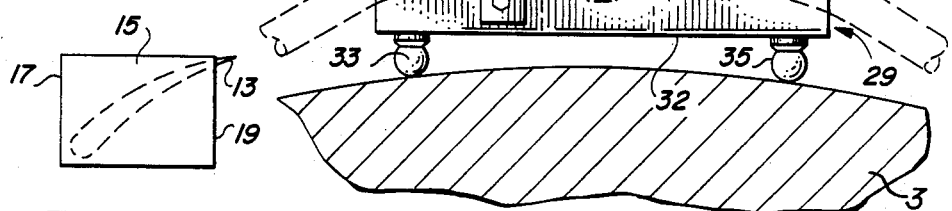

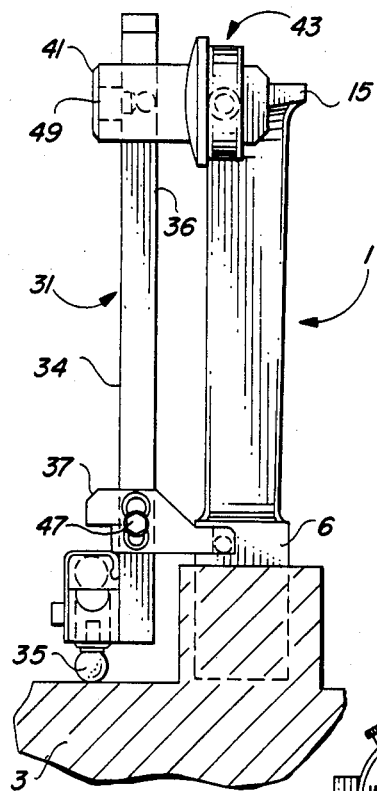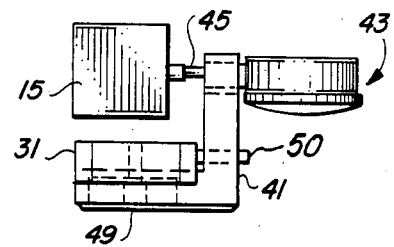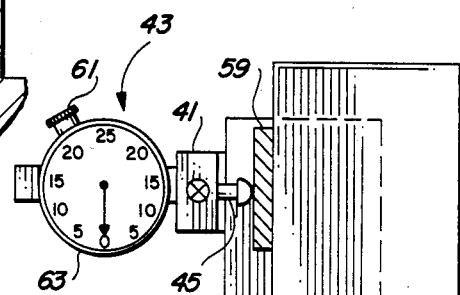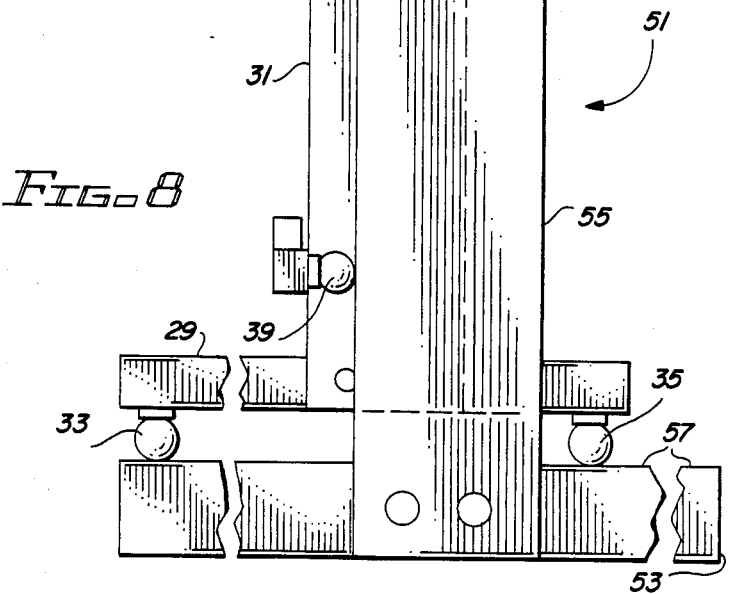

TURBINE BLADE RADIAL POSITION GAGE

This invention relates to turbines and, more particularly, to a gage for determining the radial alignment of turbine blades on a turbine rotor.

In turbines, e.g., steam turbines, a plurality of rotating arrays of blades or foils are arranged circumferentially about a rotor. Reaction of steam or gases against the blades produces rotation of the rotor and associated blade arrays. The forces acting on these rotating blades, including centrifugal froces caused by rotation, tend to throw the blades radially outward and generate large forces on the blade attachment structure. In many turbines, the attachment structure comprises a Christmas tree shaped root structure which slides into a mating slot int he rotor. When the blade is properly positioned, lugs extending from opposing sides of the root structure share equally in retaining the blade to the rotor. However, if a blade is aligned off of a radial line of the rotor through the center of the rotor groove, lugs on one side of the root structure may support more stress forces than those on the opposite side leading to potential overstress conditions and damage. Accordingly, it is desirable to assure that turbine blades are aligned with their respective centerlines oriented along radial lines of the turbine rotor.

BRIEF DESCRIPTION OF THE DRAWINGS

The objects and advantages of this invention will become more apparent by reading the folliwng detailed desription in conjunction with the accompanying drawings, in which:

FIG. 1 is a partial sectional view of a circular array of rotatable blades disposed in a rotor;

FIG. 2 is an axial view of an integral shroud blade;

FIG. 3 is a radial view of an integral shroud blade;

FIG. 4 is a tangential view of an integral shroud blade;

FIG. 5 is an axial view of an exemplary form of the inventive gage in operative position with a turbine blade;

FIG. 6 is a tangential view of another form of the inventive gate in operative position with a turbine blade;

FIG. 7 is a radial view of the inventive gage of FIG. 6; and

FIG. 8 is an elevational view illustrating one method of calibration of an illustrative form of the inventive gage.

DESCRIPTION OF THE PREFERRED EMBODIMENT

Referring now to the drawings in general and in particular to FIG. 1, there is shown a portion of a circumferential array of exemplary turbine blades 1 disposed in a portion of a turbine rotor 3.

As shown best in FIGS. 2, 3 and 4, each turbine blade comprises a Christmas tree shaped root structure 5 which registers with a similarly shaped groove or slot in the rotor 3 to fasten the blades 1 to the rotor 3. To prevent axial movement of the blades, a pin (not shown) fits a semicircular groove 7 in the blade 1, which registers with a semicircular groove in the rotor 3 (not shown). The root portion 5 extends from a blade platform 6.

Extending radially outwardly from the blade platform 6 is an airfoil shaped blade portion 9 having leading and trailing edges 11 and 13, respectively. Disposed radially outwardly of the blade portion 9 and made integral therewith is a shroud portion 15. The shroud portion 15 has a leading planar surface 17 and a trailing planar surface 19. The leading planar surface 17 as indicated by the line 20 which represents the extension of the planar surface 17 is generally parallel to an axial radial plane 21 passing through the center portion ("blade centerline") of the root structure 5 (sometimes referreed to as 'root 5'). The trailing planar surface 19 if extnded as indicated at 23 forms an angle "a" with the radial axial plane generally equal in degrees to 360 divided by the number of blades in the circular array.

The leading planar surface 17 extends beyond the leading edge of the blade portion 9 and the trailing edge 13 of the blade portion 9 extends substantially beyond the trailing planar surface 19 of the shroud portion 15.

The outer periphery of the shroud portion 15 is machined to form a cylindrical ring which cooperates with labyrinth seals to form a rotating seal.

Each of the blades 1 is desirably aligned on a radial line of the rotor 3, or, more specically, the blade centerline 21 desirably coincides with a radial line of rotor 3. In such alignment, each lug 25 on root 5 shares the centrifugal forces and stresses on blades 1 during turbine operation. If one of the blades 1 is misaligned, its root 5 may be stressed off-center causing a force increase on one or more lugs 25 on only one side of the root. Such force increase may exceed the stress capability of the root structure resulting in blade root damage or may damage the rotor slot in which the blade roots are retained. Since blade separation, whether from root failure or rotor slot failure, can be disastrous in a turbine, it is desirable to assure proper blade alignment at time of assembly.

Referring generally now to FIG. 5-8, a left-hand and a right-hand form of the present invention for determining alignment of blades 1 on a rotor 3 are illustrated. FIG. 5 is a simplified view looking axially along the rotor surface and shows a blade 1 in phantom lines with a left-hand form of the invention. The invention comprises a gage 27 having an elongated base member 29 and a standard 31 extending, in the exemplary embodiment, substantially perpendicularly from the base member. While shown centered and therefore extending perpendicularly, it will be apparent that standard 31 is merely a support structure and need only extend radially outward with respect to the rotor 3. First and second elevated contact points in the form of tooling balls 33, 35 are attached in spaced apart relationship to a lower surface of the member 29. The tooling balls, well known in the machinist's art, provide contact points between the gage and the surface of rotor 3 and support the member 29 adjacent the rotor 3 and in a plane substantially parallel to a tangent line to the rotor surface. However, it will be appreciated that the contact points at the tooling ball/rotor surface interface are such that a line between the contact points at the interface is perpendicular to a radial line of the rotor and therefore parallel to a tangent line to the rotor surface. The balls 33, 35 may be attached to member 29 in a manner well known in the art such as, for example, by being drilled and tapped and connected by screw-type studs. The standard 31 has one nd fixedly attached to member 29 by bolts or welds (not shown).

For simplicity of construction and use, both member 29 and standard 31 are preferrably formed or machined as elongated bars having substantially parallel opposing surfaces 30, 32 and 34, 36, respectively.

Standard 31 supports an arm member 37 extending from a lower portion thereof and carrying a tooling ball 39. The arm member 37 is positioned such that the tooling ball 39 creates a third contact point for contacting surface 8 of blade platform 6 when the gage is in a measuring position. It should be noted that platform 6 is a precision machined portion of the blade 1 and is carefully situated with respect to root 5, surface 8 being machined parallel to blade centerline 21.

At a distal end of standard 31 from member 29 there is located a second arm 41 which supports a measuring apparatus 43 illustrated as a dial indicator gauge, sometimes referred to as a dial micrometer. The dial indicator apparatus 43 includes a dial indicator 44 and a reciprocating plunger 45. The arm 41 supports the apparatus 43 such that plunger 45 is brought into contact with an edge surface 17 of shroud portion 15 of blade 1 when the gage is in the measuring position. The apparatus 43 is calibrated with respect to the third contact point so that any deviation of the alignment of blade 1 off a rotor radial line through the center of the blade root will result in a non-zero reading. Shroud portion 15 is a precision machined portion of the blade 1 and the surface 17 contacted by plunger 45 is machined parallel to the axial radial plane 21. Both the arms 37, 41 may be attached to standard 31 by bolts or screws such as those indicatd at 47, 49 although other forms of fixedly attaching the arms to standard 31 may be used. Furthermore, while the arms 37, 41 are shown as L-shaped in FIGS. 5-7, straight arms could be employed by merely changing the form and/or points of attachment. A set screw 50 provides support for arm 41.

Turning briefly to FIG. 8, there is illustrated one method and apparatus for calibrating the gage 27. A gage calibration stand 51 comprising a base 53 and a perpendicular member 55 is used to establish zero calibration of dial indicator 43. The base 53 has a precision machined flat top surface 57. Member 55 is attached to base 53 to form a perpendicular reference. The gage 27 is placed on surface 57 and positioned with tooling ball 39 in contact with member 55. Depending upon the particular design or configuration of turbine blade to be aligned, various thickness shims 59 are positioned between member 55 and plunger 45 of indicator apparatus 43. The shims 59 are preselected to accomodate different dimension shroud portions 15 or offsets of shroud portions 15 from platform portions 6. With the gage 27 in position against member 55, a bezel lock 61 is released to allow bezel 63 on dial indicator 43 to be turned for setting a zero reading. Lock 61 is then tightened. This completes the calibration of gage 27 and prepares it for use in determining alignment of blades 1 on a rotor 3.

The method of determining blade alignment can be appreciated by reference to FIGS. 5-6. The gage 27 is placed on a rotor 3 adjacent to one of the blades 1. The tooling balls 33, 35 rest on the rotor surface and assure alignment of the gage 27 with a rotor radius. As is well known, the rotor surface includes a plurality of alternating lands and valleys (shown in FIG. 6) in the axial direction, the lands having the grooves or slots formed therein for receiving the blade roots 5. The gage 27 is positioned for use on the rotor surface in a valley adjacent a blade 1 to be measured. The gage 27 is moved circumferential on the rotor surface until the tooling ball 39 contacts blade platform 6. To avoid having to hold the gage 27 in place for checking alignment of each blade 1, an elastic cord 65, e.g., a bungy cord, may be wrapped around the rotor 3 and over base member 29. For that purpose, there is provided a retaining member 66 attached to base member 29 having a double folded lip for engaging and slidably holding cord 65. With ball 39 in position against platform 6, any non-zero reading of dial indicator apparatus 43 represents a deviation of the blade centerline from a rotor radius line. The blade 1 may be replaced if the deviation exceeds allowable limits.

The gage 27 thus assures alignment of a centerline axis 21 of a turbine blade 1 with one preselected radial line (the radial line through blade root 5) of the turbine rotor 3 when the blade 1 is mounted in an assembly position in a rotor slot (as shown in FIG. 1) and extending radially outwardly from a circumferential surface of the rotor 3. The base member 29 and its tooling balls 33,35 along with standard 31 comprise adjustable means for engagement with the circumferential surface of the rotor 3 and permit adjustable movement on the rotor with respect to the blade 1 when blade 1 is in its assembly position. The arm 37 and tooling ball 39 comprises means conjointly movable with the adjustable means for engagement with a part of the blade, preferrably the platform 6, when the blade 1 is in the assembly position. The measuring apparatus 43 and its support arm 41 comprise means associated in spaced apart relation with the engagement means 37,39 and further includes the plunger means 45 for engaging another blade portion, preferably the shroud surface 17, which apparatus 43 is operable generally for indicating any misalignment between the blade centerline axis 21 and the radial line of the rotor through the center of the groove occupied by the blade 1 in its assembly position.

While the invention has been described in conjunction with turbine blades having root portions which engage axial grooves in the rotor, it will be apparent that it is also useful with other types of blades, such as, for example, blades which engage tangentially oriented grooves in the rotor. Furthermore, while the measuring apparatus has been shown as a dial indicator, other types of devices such as vernier micrometers could also be used. Accordingly, it is intended that the invention be given an interpretation commensurate with the scope of the appended claims.

We claim:

1. Apparatus for determining radial alignment of turbine blades on a turbine rotor by in situ measurement of blade alignment with respect to the surface of the rotor, each of the blades including a root structure for supporting the blade in a matching groove in the rotor, a platform attached to the root structure and an airfoil extending radially outward from the platform and terminating in an integral shroud portion, the apparatus comprising:

an elongated base member having substantially parallel upper and lower surfaces;

first and second elevated contact points formed in spaced apart relationship on the lower surface of said base member, said contact points being adapted to support said base member adjacent the rotor and in a plane substantially parallel to a tangent line to the rotor surface;

a standard having one end fixedly connected to said base member, said standard extending radially outward with respect to the rotor, said standard comprising a rectangular member having substantially parallel opposing surface aligned in an axial direction with respect to the turbine rotor;

a first arm member fixedly attached to and extending from a lower portion of said standard;

a third contact point extending from said first arm member in a tangential direction with respect to the turbine rotor and positioned for contacting the blade platform when the apparatus is in a measuring position, a point of contact between said third contact point and the blade platform being tangentially displaced from a centerline of the blade;

a dial indicator having a reciprocating plunger operatively connected thereto, the extension of said plunger with respect to said indicator providing a reading on said dial indicator representative thereof;

means for attaching said dial indicator to said standard such that said plunger contacts the shroud portion when the apparatus is in the measuring position, said attaching means comprising a second arm member having one end fixedly attached to one of said opposing surface of said standard and having a portion extending normally with respect to said one of said opposing surfaces toward the turbine blade, said attaching means being circumferentially offset from a radius passing through a root of a blade to be aligned and said dial indicator being mounted to said attaching means with said plunger extending tangentially with respect to the turbine rotor; and means for calibrating the dial indicator such that deviation of radial alignment of the blade with respect to a rotor radial line through the center of the blade root is provided by said indicator.

2. A gage for determining radial alignment of a turbine blade in a circular array of blades on a turbine rotor by measurement of deviation of a centerline of the blade from a radial line of the rotor, said gage comprising:

a base member having a lower surface for positioning adjacent a surface of the rotor;

first and second contact points formed on the lower surface of said base member;

a standard having one end attached to said base member, said standard extending substantially perpendicular to a line connecting said first and second contact points at the points of contact with the rotor surface;

a third contact point attached to said standard in position for contacting a predetermined surface of the blade when the first and second contact points are abutting the rotor, said predetermined surface being circumferentially offset from a blade centerline and said third contact point being tangentially directed toward said predetermined surface; and a measuring apparatus fixed to said standard at a location remote from said third contact point, said apparatus being positioned to contact a second predetermined point on the blade for providing an indication of deviation of the blade centerline from a corresponding radial line of the rotor, said second predetermined point being circumferentially offset from the blade centerline and said measuring apparatus being tangentially directed toward said second predetermined point, a line connecting said third contact point and said second predetermined point being offset from the blade centerline by an angle $\alpha$, where $\alpha$ is approximately 360 degrees divided by the number of blades in a circular array of blades about the turbine rotor.

3. The gage of claim 1 wherein said measuring apparatus comprises a dial indicator having a shaft extending substantially perpendicular to the blade centerline, said shaft contacting the blade at said second predetermined point.

4. The gage of claim 2 whereinthe blade includes a platform portion for a root structure, an airfoil extending radially outward from the platform and terminating in an integral shroud portion, said third contact point being positioned for contacting a surface of the platform and said plunger being positioned for contacting a surface of the shroud parallel to the balde centerline.

5. The gage of claim 2 wherein said dial indicator is supported on an arm from said standard substantially perpendicular to the blade centerline.

6. A gage for assuring the alignment of a centerline axis of a turbine blade with one preselected radial line of a turbine rotor through the center of the blade root when the blade is mounted in an assembly positin extending generally radially outwardly from a circumferential surface of the rotor, the gage comprising:

adjustable means for engagement with the circumferential surface of the rotor and for adjustable movement thereon with respect to the blade in the assembly position thereof;

means on said adjustable means and conjointly movable therewith for engagement with a first part of the blade in its assembly position; and means associated in spaced apart relation with said engagement means on said adjustable means for conjoint movement therewith and including means movable into engagement with another part of the blade spaced from the first part thereof and operable generally for indicating any misalignment between the centerline axis of the blade and the one preselected radial line of the rotor with the blade in the assembly position thereof.

* * * * *